March 16, 1965 G. L. CONGDON 3,173,164
BUILTIN VACUUM CLEANER
Filed May 18, 1960 5 Sheets-Sheet 1

INVENTOR.
GEORGE L. CONGDON
BY Wheeler, Wheeler and Wheeler
ATTORNEY

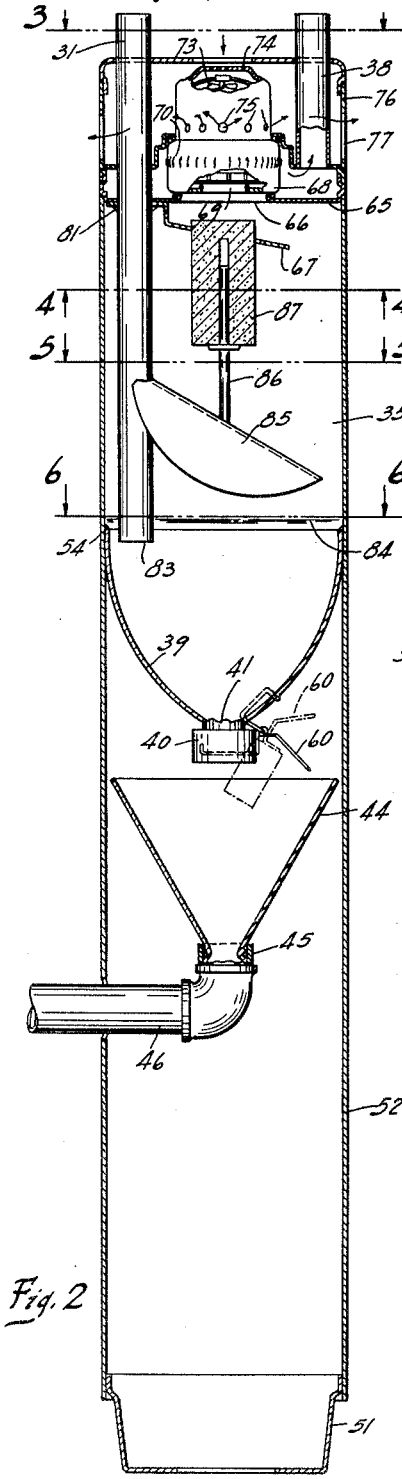
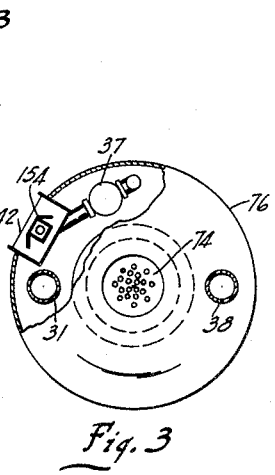
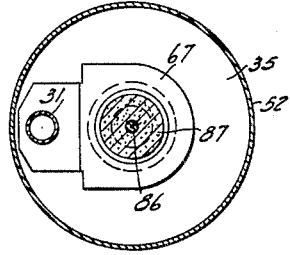
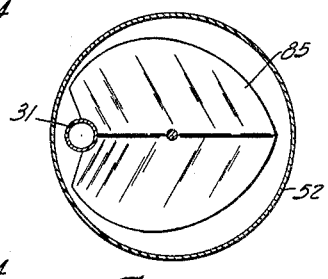
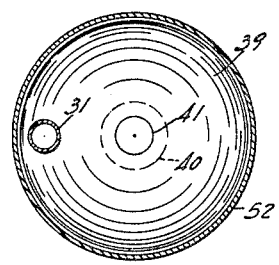
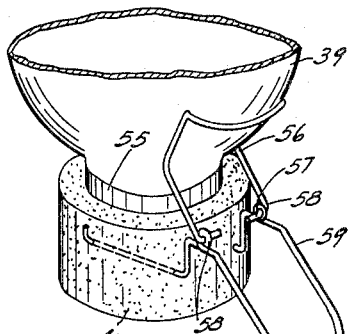

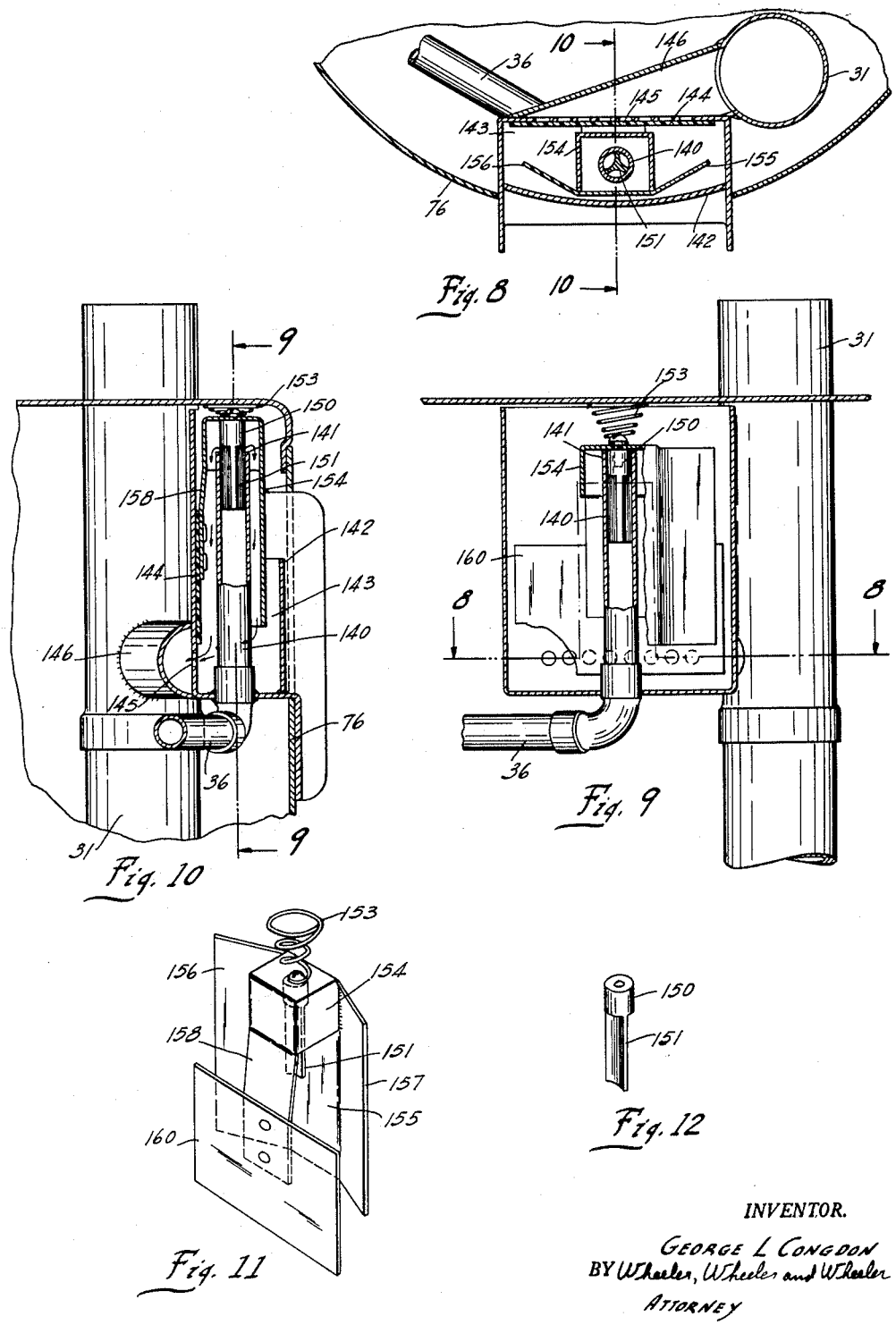

March 16, 1965 G. L. CONGDON 3,173,164
BUILTIN VACUUM CLEANER
Filed May 18, 1960 5 Sheets-Sheet 4

INVENTOR.
GEORGE L. CONGDON
By Wheeler, Wheeler and Wheeler
ATTORNEY

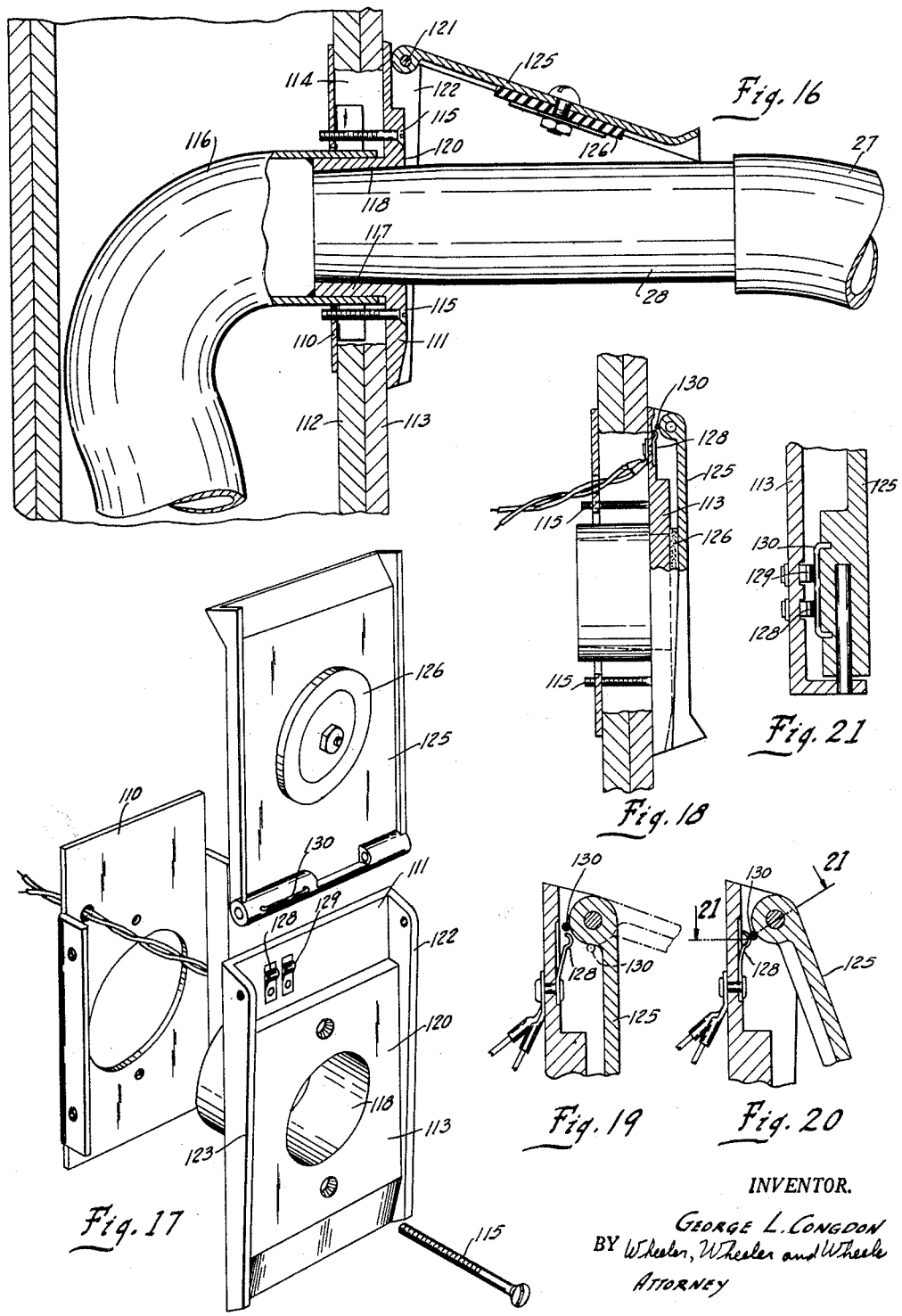

United States Patent Office 3,173,164
Patented Mar. 16, 1965

3,173,164
BUILTIN VACUUM CLEANER
George L. Congdon, Fort Atkinson, Wis., assignor, by mesne assignments, to Whirlpool Corporation, St. Joseph, Mich., a corporation of Delaware
Filed May 18, 1960, Ser. No. 29,991
17 Claims. (Cl. 15—314)

This invention relates to a builtin vacuum cleaner.

Any desired wand and flexible hose can be plugged into one of several appropriate fittings, those which are not in use being preferably sealed. Permanently installed piping connects these with apparatus which withdraws and discharges air, trapping entrained dirt in water which is later dumped into the sewer system.

There are a number of novel features. In an arrangement whereby a trap which separates the dirt from the air is filled with water, it is a feature of the present invention that the trap is dry until the air flow commences, the water being introduced through the same pipe which carries the dirt-laden air, the pressure differential in the trap being used to close a valve which will support the water in the trap as long as the pressure differential continues and will thereafter open to dump the water and entrapped dirt.

Another feature of the invention consists in an anti-siphoning arrangement which makes it impossible for dirty water to return to the water system in the event of failure of water pressure or of any other part of the apparatus. At the same, the separating chamber or trap is sealed against loss of vacuum if no water is flowing thereto.

Still another feature permits the use of a wet type floor tool such as is commonly employed with detergents for cleaning floors, the arrangement being such that if water or foam rises in the dirt-separating chamber the communication between the chamber and the suction fan will automatically be shut off to dump the liquid content of the chamber and preclude any of the water or foam from reaching the air ejection pipe, or the blower which creates the vacuum and propels air through such pipe.

The system is operated either by means of a manually set time switch or by means of a pulsing switch indiviual to each hose connection to initiate blower operation when the cover is raised to plug in the cleaner and to cut off the blower by means of a second pulse consequent upon the closing of the cover.

In the drawings:

FIG. 2 is an enlarged detail view in axial section through the separating chamber.

FIG. 3 is a plan view of the chamber taken in the plane indicated at 3—3 of FIG. 2, portions of the chamber top being broken away to expose the anti-siphoning device.

FIG. 4 is a detail view taken in section on the line 4—4 of FIG. 2.

FIG. 5 is a view taken in section on the line 5—5 of FIG. 2.

FIG. 6 is a view taken in section on the line 6—6 of FIG. 2.

FIG. 7 is an enlarged view in perspective showing the automatic dump valve at the bottom of the separating chamber, a portion of the chamber being fragmentarily illustrated.

FIG. 8 is a section taken on line 8—8 of FIG. 9.

FIG. 9 is a view taken in section on the line 9—9 of FIG. 10.

FIG. 10 is a view taken in section on the line 10—10 of FIG. 8.

FIG. 11 is a perspective view showing in detail the anti-siphoning valve structure used in the device illustrated in FIGS. 8 and 10.

FIG. 12 is a perspective view showing in detail the guide for the valve structure of FIG. 11.

FIG. 16 is an enlarged detail view in axial section through a portion of a partition wall and vacuum coupling fitting.

FIG. 17 is a view in perspective showing in separated positions the component elements of such a fitting.

FIG. 18 is a view similar to a portion of FIG. 16 showing the fitting closed.

FIG. 19 is a greatly enlarged detail view showing a pulsing switch preferably used in such a fitting.

FIG. 20 is a view similar to FIG. 19 showing the pulsing switch in circuit closing position.

FIG. 21 is a detail view taken in transverse section on the line 21—21 of FIG. 20.

Figures 1, 13:
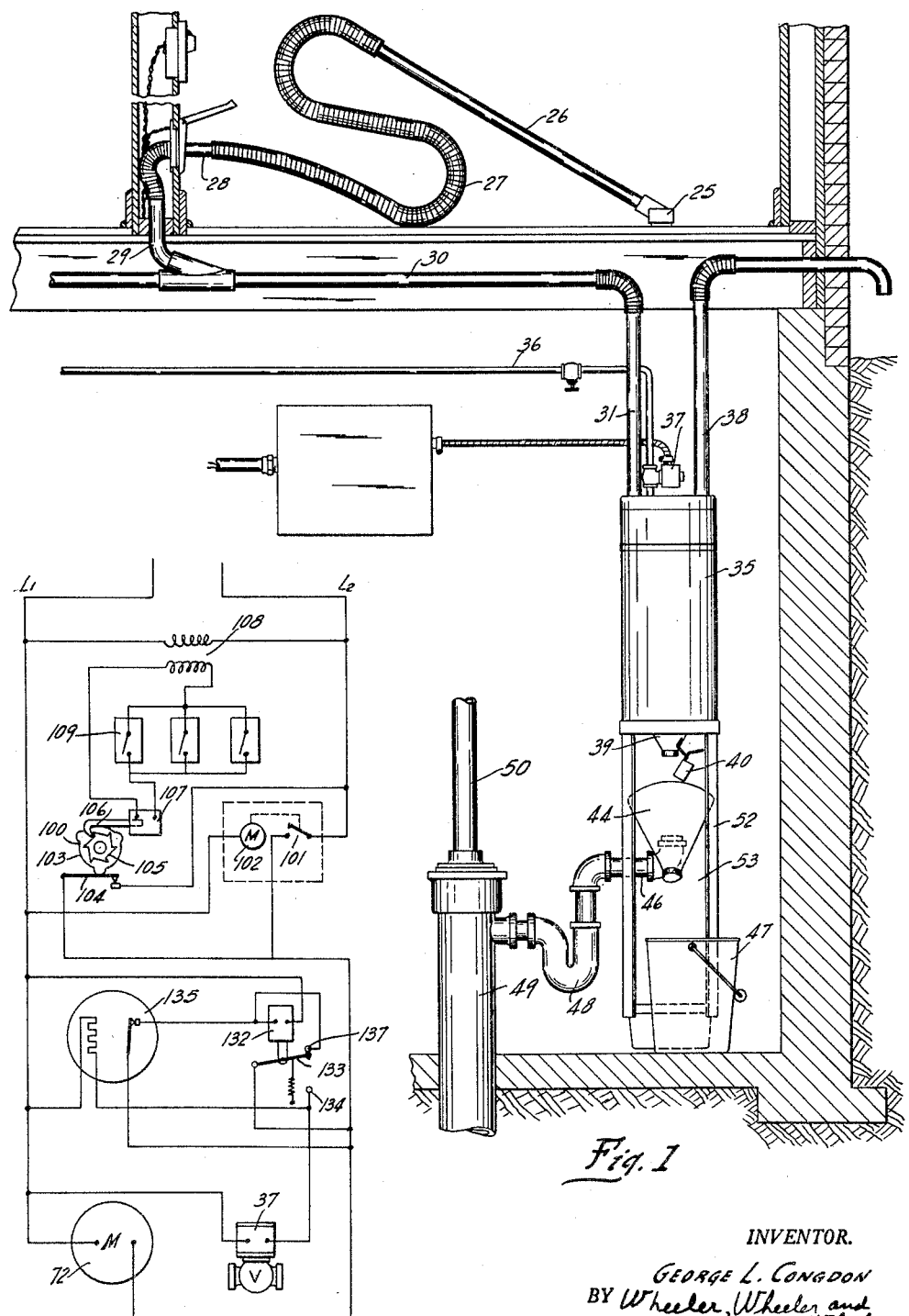
FIG. 1 is a diagrammatic section fragmentarily illustrating a building in which this improved system is installed, the system itself being shown largely in side elevation.
FIG. 13 is a circuit wiring diagram.

FIG. 1 diagrammatically illustrates the general organization in a typical installation. The floor tool 25 is conventionally mounted at the end of a tubular wand 26 manipulated by the operator and having any desired length of vacuum hose 27 terminating in a metal sleeve 28 which may be plugged into a wall fitting such as those shown in FIGS. 16 to 18.

From the wall fitting, a pipe 29 leads to the main vacuum line 30 which extends toward the trap or separating chamber 35 hereinafter to be described. Also extending toward such chamber is a water supply pipe 36 having a solenoid control valve 37. Air drawn into the separating chamber 35 through means hereinafter disclosed is expelled through pipe 38 which preferably leads out-of-doors as shown in FIG. 1.

The bottom 39 of collecting chamber 35 tends to retain water supplied thereto subject to control of a normally open dump valve 40. This valve normally hangs in the position shown in dotted lines at FIG. 2 but is so counterbalanced that any influx of air through the port 41 in the bottom 39 of chamber 35 will cause the valve to shift to the closed position in which it is shown in full lines in FIG. 2. Pressure differential holds the valve tightly closed. When vacuum is relieved, the valve 40 opens under weight of water in the separating chamber. The water and dirt are thereupon dumped.

Beneath the dump valve, there is a funnel at 44 normally seated in the open end 45 of the drain pipe 46 as shown in FIG. 2. However, the funnel 44 may readily be withdrawn from the pipe for discharge into a pail 47 as shown in FIG. 1. The drain pipe 46 leads through a trap 48 to the sewer pipe 49 which is conventionally provided with a vent at 50.

Details will now be described in connection with the assembly best shown in FIGS. 2 and 7. This assembly is ordinarily installed in a basement or other out of the way place.

Upon the pan-like base 51 is a tubular column 52 which desirably has a side panel removable to expose an opening 53 through which the funnel 44 may be manipulated as shown in FIG. 1.

Fixed within the column at a level above the funnel 44 is the bottom portion 39 of the separating chamber 35. This bottom may be welded as at 54 to the interior of the column. As already indicated, the bottom 39 terminates in a port-forming sleeve 55, the end of which serves as a seat for the valve 40. The valve is made of cork or foamed synthetic resin and is therefore very light. A wire bracket 56 is welded or soldered externally to the bottom 39 of the separating chamber and includes a transverse pintle portion 57 upon which are pivoted the two eye portions 58 of a wire 59 which carries the valve 40 and also has a loop portion 60 serving as a counterweight. Not only does it take very light pressure to move the valve to its seat, but the inertia of the valve is also very slight. Consequently, whenever the vacuum fan hereinafter described develops a vacuum in the separation chamber 35, the valve 40 will move to its seat by reason of the air flow which initially occurs upwardly through the port 41. Once this valve is seated, the pressure differential renders it capable of supporting quite a substantial head of water introduced into the separating chamber in a manner hereafter described. When the pressure differential is relieved (several ways of doing this are described below), the valve 40 will open and any water and dirt present will be dumped into the funnel 44, which is normally connected with the drain pipe 46.

The tubular column 52 supports an annular pressure chamber 65 having an air inlet at 66 shielded by a baffle 67. Positioned within and supported upon the pressure chamber 65 is the blower housing 68 of a motorized blower. The blower housing has an inlet 69 registering with the inlet 66 of the pressure chamber and it has a plurality of peripheral outlets 70 which deliver into the pressure chamber under pressure the air withdrawn from the separating chamber 35. This air escapes through the air discharge pipe 38 which preferably leads out-of-doors as shown in FIG. 1. The motor 72 (FIG. 14) desirably has its own cooling system which includes a small fan 73 that draws air into the casing through ports 74 and expels it through ports 75, the top section 76 of the column being open to the atmosphere at 77. The armature shaft 78 drives a one or multi-stage blower which, as shown in FIG. 14, comprises two separate blower elements 79 and 80.

The vacuum line 30 leads downwardly through the upper section 76 of the column having a vacuum tight connection at 81 with baffle 67 and the bottom of pressure chamber 65, the latter constituting a closure for the separating chamber 35.

The discharge end portion 83 of the air inlet pipe 31 extends well down into the separating chamber 35 to a point which is below the water level 84 which is maintained in the separating chamber during a vacuum cleaning operation. In a manner which will presently be explained, water is introduced into the chamber through a lower portion of pipe 31 itself, the separating chamber being normally dry at the commencement of any given cleaning operation. Mounted conveniently from pipe 31 itself is a downwardly convex and downwardly inclined baffle 85 to which is fastened an upstanding rod 86 which serves as a guide for a float valve 87 which is preferably foamed plastic, and consequently very light. The valve will lift not only in response to the presence in the separating chamber of water at an unduly high level, but it will also lift if detergent foam occurs in the chamber in substantial quantities. When the valve 87 rises upwardly on stem 86, it seats against the lower end of the fan casing 68 to seal the admission port 69 into such casing. This will destroy the vacuum in the separating chamber 35 and the dump valve 40 will thereupon open to discharge the liquid and dirt into the funnel 44 which leads to the sewer drain 46.

Figure 14:
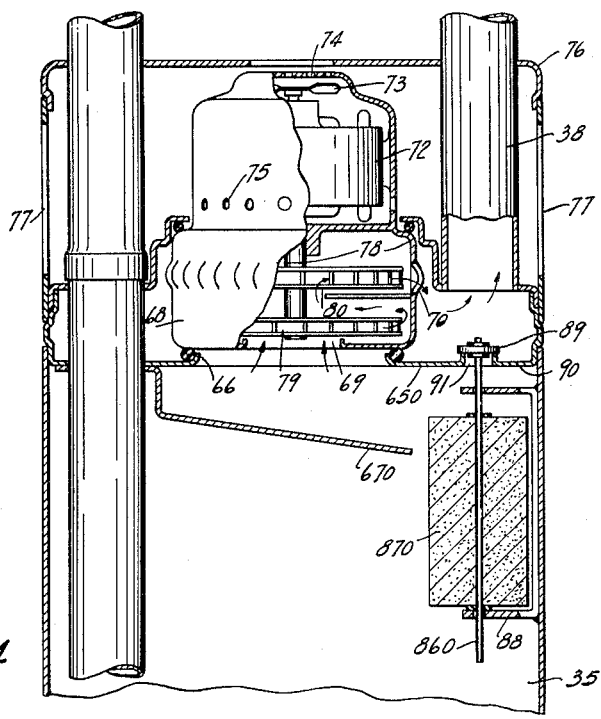
FIG. 14 is a fragmentary view on an enlarged scale showing a section comparable to FIG. 2 of a modified way of preventing foam from reaching the blower.

In the alternative construction shown in FIG. 14, the float 870 is fixed to a rod 860 reciprocable through the arms of bracket 88. At the upper end of the rod is a valve 89 which normally seats on a flange 90 which surrounds the port 91 in the pressure chamber 650. In this construction, the baffle 670 is not apertured in registery with the port 69. When the foam rises in the separation chamber 35, the float 870 will rise with it to open the valve 89 thereby permitting air under pressure to pass downwardly from the pressure chamber 650 into the separation chamber 35 thereby breaking the vacuum. As before, the breaking of the vacuum permits the dump valve 40 to open under the load of water which is imposed upon it, thereby discharging the water, dirt and foam from the separating chamber.

Figure 15:
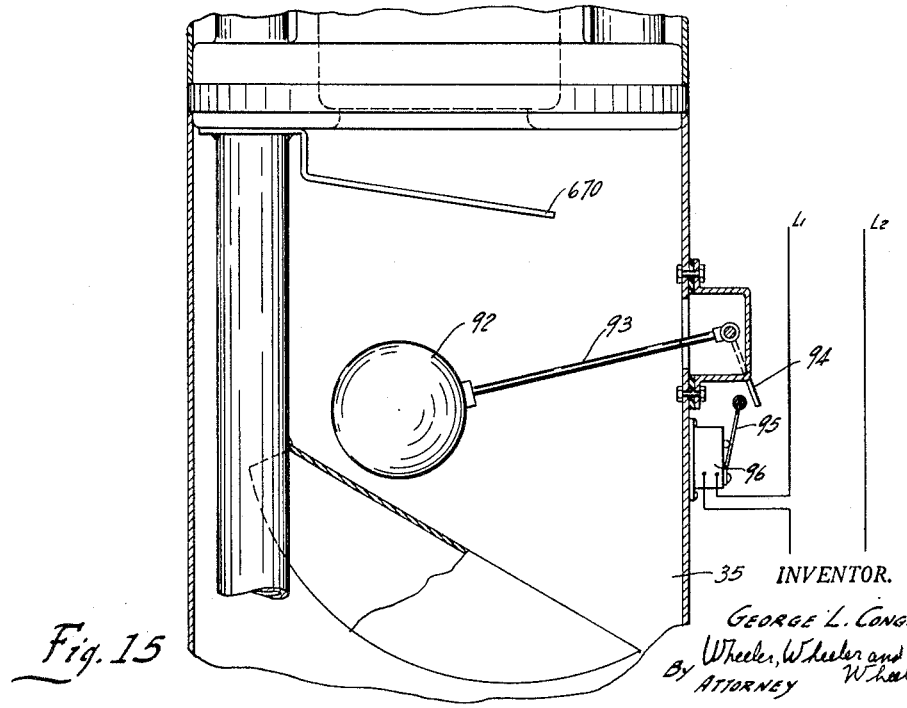
FIG. 15 is a view taken in section comparable to that of FIG. 2 showing a further modified foam control embodiment.

FIG. 15 shows another modification in which a float 92 is disposed in the separating chamber 35 and mounted on a bell crank lever 93. The arm 94 of the bell crank lever is positioned to engage the actuator 95 of a normally closed switch 96 connected in the circuit to the motor 72, the arrangement being such that if foam rises in separating chamber 35, the motor 72 is shut off, thereby breaking the vacuum and dumping the contents of the separating chamber.

The circuit for controlling the motor as well as the water supply is shown in FIG. 13. The line L–1 goes directly to the motor 72. The line L–2 extends to the motor subject to control, in parallel, by a step relay 100 or the interval timing switch 101. The interval timing switch has its own motor 102 and the usual arrangement (not shown) whereby the switch may be set to be re-opened by the motor after a predetermined interval of time. When switch 101 is closed, the vacuum motor 72 is energized.

The step relay 100 provides an alternate way of controlling the vacuum motor 72. It includes a cam 103 which is rotatable to close, or to permit the re-opening of, the normally open switch 104 through which current is carried to the vacuum motor 72. The cam 103 carries a ratchet 105 operated in successive steps by a reciprocable pawl 106 which constitutes the armature of an electromagnet 107. The magnet receives power from transformer 108 subject to the control of impulse switches 109 which are connected in parallel and associated with the closure lids for respective vacuum couplings as shown in FIGS. 17 to 20 as hereinafter described. When the impulse switch connected with the closure lid transmits an impulse to the magnet 107, the cam 103 is advanced one step, thereby closing switch 104 if such switch is open, or permitting switch 104 to open if already closed. For certain purposes, the user of the system may desire to have the vacuum motor operate for a predetermined interval, in which case the interval timer switch 101 will be used. For other purposes, it may be desired that the vacuum motor be operated only when the hose is plugged into the wall fitting as in FIG. 1. In that case, the interval timer switch 101 is left open and the vacuum motor is controlled entirely by raising and lowering of the lid which normally closes the wall fitting.

The wall fitting shown in FIG. 17 has no switch. It comprises inner and outer plates 110 and 111 clamped to plies 112 and 113 which constitute the exterior surface of the partition wall. The plates span the opening 114 provided in the wall. They are held together by clamping bolts 115. The end of the permanently installed flexible conduit 116 extends through the inner plate 110 and is sleeved upon and connected with a tube 117 which is fixed in the outer plate 111 and has a tapered interior surface at 118 into which the coupling fitting 28 of the vacuum hose 27 may be inserted to a tight fit.

The external surface of the plate 111 provides a seat at 120 about the opening into which the coupling fitting 28 is receivable. Hinged upon a pintle 121 carried by the side flanges 122 and 123 of the outer plate 111 is a closure 125 which carries a packing disk 126 for engagement with the seat 120. When the coupling fitting 28 is not inserted into the tapered seat 118 of the wall fitting, the cover 125 will fall by gravity to its closed position wherein the packing 126 will tightly seal the inlet to the wall fitting.

If it be desired to control the vacuum motor automatically according to insertion or removal of the coupling fitting 28, switch contacts may be provided upon the enclosure 125 and on the plate 111. In the preferred embodiment, the switch 109 diagrammatically shown in FIG. 13, comprises two fixed contacts 128, 129 (FIGS. 17 to 21) which are wiped by a movable contact 130 as the closure 125 is raised or lowered. FIGS. 18 and 19 show the closure 125 in its lowered or closed position, the wiping contact 130 being above the stationary contacts 128, 129. When the closure 125 is raised to the position shown in dotted lines in FIG. 19, the wiping contact 130 will move across the fixed contacts 128 and 129 as shown in FIG. 20, thereby closing a circuit to cause an impulse which will operate the step relay cam 103 (FIG. 13). However, when the closure is raised high enough to permit insertion of the vacuum hose coupling fitting 28, it will be in the position shown in dotted lines in FIG. 19 and the wiping fitting 130 will be disengaged from the stationary contacts 128, 129. Only when the closure moves back to the FIGURE 20 position toward the full line position of FIG. 19 will there be another impulse which will again actuate the step relay cam 103, thus re-opening the circuit closed when the closure plate was lifted.

Reference has been made to the fact that when the vacuum motor is energized water is supplied to the normally empty separating chamber. This is done by energizing the solenoid valve 37 which is parallel with the vacuum motor 72 but preferably has an additional control which determines the period for which the solenoid valve remains open. By determining the time for which water flows into the separating chamber (in relation to known rate of flow), it is possible to determine the level to which the separating chamber will be filled in a given operation.

Relay 132 has its armature connected with a switch contact 133 normally engaged with contact 134 to provide a circuit to the solenoid valve in parallel with the vacuum motor 72 so that the water begins to flow simultaneously with energization of the vacuum motor. The operation of relay 132 immediately moves the contactor 133 from stationary contact 134 to contact 137 to set up a holding circuit when the normally open time delay relay 135 is closed by current flowing through its heater coil. This opens the circuit to the solenoid valve 37 allowing the valve to close after a time interval sufficient to provide the desired water level in the separator chamber. Selection of the proper relay achieves this result regardless of the pressure at which water is supplied.

The water supplied subject to the control of the solenoid valve 37 is not delivered directly into the separating chamber 35 but is delivered thereto through the anti-siphoning controls shown in FIGS. 8 to 12.

When the solenoid valve 37 is open, the water entering the pipe 36 is led into a stand pipe 140, the top end 141 of which extends well above the top end 142 of a water-receiving trough 143. The wall 144 of this trough has multiple apertures 145 opening into a channel at 146 which leads to the vacuum line 31, this being the pipe that opens downwardly into the separating chamber at 83 as already described in connection with FIG. 2.

A plunger 150 has a fluted guide stem 151 shown in FIGS. 8 and 12. When the water pressure is off, the plunger is received into the upper end of the stand pipe 140 as shown in FIG. 9. When the water pressure is turned on, the pressure raises the plunger 150 against the compression of spring 153, thus letting the water flow about the fluted guide stem 151 over the top edge of stand pipe 141. The water is confined by a tubular cap 154 which is connected with plunger 150 and encloses the upper end of the stand pipe. The plate 155 provides wings 156 and 157 projecting laterally from the cap 154 to prevent splashing and to assure that the water will descend within the wall 142 of trough 143.

Connected by arm 158 with cap 154 is a flexible valve sheet 160 which, in practice, has been made of polyethylene. The valve sheet is stiff enough to maintain its form but flexible enough to seat securely across the several ports 145 which lead from the trough 143 to the channel 146. Thus, when the water pressure is off, the valve sheet 160 is held securely by differential pressure across the ports 145 to seal such ports.

Converse flow of water from the trough 143 into the water supply pipe 36 is impossible because the stand pipe 140 extends high above the margin 142 of the trough 143 and, moreover, the stand pipe is sealed at its upper end by the plunger 150 whenever there is no pressure of water arriving through the stand pipe. The level of water in the trough 143 never can rise above the margin 142 because the device is so installed (see FIGS. 8 and 10) that water above the level of such margin will be discharged outwardly through the side of the upper portion 76 of the apparatus.

While it is believed that the operation of the device will be apparent from the foregoing description, it may be summarized as follows:

According to whether the operator closes the switch 101 of the interval timer or whether the operator elects to use switches individual to the respective vacuum hose connections, in either case, the motor 72 is energized to operate the vacuum fan 79, 80 and, at the same time, water is introduced into the system through the solenoid valve 37.

The operation of the vacuum fan closes the normally open balanced valve 40 and the pressure differential will hold such valve tightly seated against any load of water that may be introduced into the separation chamber 35. The dirt-laden air picked up by the floor tool 25 and passing through the wand 26, hose 27, coupling fitting 28 and pipes 29, 30 and 31 will be exposed to water admitted to pipe 31 and flowing with the dirt-laden air toward the sump portion 39 of the separating chamber 35. As the water collects in the sump, supported by the valve 40, the dirt-laden air will be directed against the surface of the water, the dirt tending to remain in the water. Shortly after the start, the water level rises to the level indicated at 84, whereby the dirt-laden air arriving through the immersed end 83 of the inlet pipe 31 will have to bubble up through the water, thus assuring that the entrained dirt will be wet and remain in the water. The air, freed of entrained dirt, is ejected through the discharge pipe 38.

The vacuum in the separating chamber 35 may be broken in any one of a number of ways. It is broken if the vacuum motor 72 ceases to operate due to the opening of one or another of the switches through which it is energized. It may also be broken if the water level or foam level within the separating chamber 35 rises to such a height that the float 87 or the float 870 or the float 92 is raised. Any interruption of the vacuum, however effected, results in an equalization of pressures to which the balanced valve 40 is subject. Any substantial reduction in pressure differential across that valve will allow the weight of water imposed thereon to open the valve, whereupon the entire content of the separation chamber dumps into funnel 44, normally in communication with the trap and sewer.

If the operator is aware that some article of value has been picked up by the vacuum cleaner, the operator may disconnect the funnel 44 from the sewer connection pipe 46 and tilt it outwardly into a pail 47, thereupon opening the counterweighted valve 40 by hand. This will discharge the contents of the separating chamber into the pail, where a search may be made for the missing article.

At no time does the water in the system impose undue load on the vacuum pump or blower, despite the fact that during normal operation the lower end of pipe 31 is below water level. Due to the fact that the separating chamber is empty when air flow through the system is started, there is no back pressure at all at the outset and by the time the water level reaches the end of the pipe, the air flow is well established and the bubbles of air introduced into the water minimize the weight of water which would otherwise produce back pressure. The fact that the water is introduced through the air line 31 makes it practicable to start with an empty separating chamber, since the water is brought into intimate contact with the dirt in the admission pipe 31 during the period when the water is flowing prior to establishment of the static water level in the separating chamber.

In practice, there is never any heavy accumulation of the dirt in the water of the separating chamber for the reason that water is periodically dumped and replaced automatically at short intervals determined either by the timer or by the removal of the hose coupling from one fitting to another. The water is in violent agitation by reason of the air bubbling through it and the relatively small quantities of dirt picked up in any given operation will be maintained in suspension and will readily flow from the separating chamber when the water is dumped, without any accumulations on the wall of that chamber.

As above noted, it is impossible for polluted water to be sucked back into the water system regardless of relative pressure or lack of pressure in the water supply line and regardless of vacuum or lack of vacuum in the suction system. Dual protection against aspiration of polluted water into the stand pipe is provided. In the first place, the plunger 150 closes the top of the stand pipe whenever water pressure ceases to force it out. In the second place, the stand pipe is exposed to the atmosphere above the margin 142 of the trough into which water overflowing the stand pipe is received for delivery to the separating chamber.

At the same time the vacuum cleaning system is protected against loss of vacuum in the event of water failure. The ports 145 are sealed by water when the water is present and are closed by the valve sheet 160 whenever water ceases to flow from the stand pipe.

While the invention has been described with particular reference to a vacuum cleaner, the subject matter is usable in various types of vacuum devices not always regarded as cleaners, dental equipment being an example.

I claim:

1. In a vacuum device, the combination with a separating chamber having a dump port in its bottom and provided with an air inlet pipe and with means for admitting water, of a vacuum pump comprising a blower having an inlet opening from said chamber and an exhaust connection, a dump valve having means supporting it for movement to and from the port, said valve having bias toward open position and being adapted to be closed and held closed by pressure differential during operation of said blower, means for introducing water into the chamber in the course of blower operation, and a float in said chamber and float operated means for destroying the vacuum in said chamber whereby to dump the contents of the chamber in the event that said float is lifted to a predetermined position.

2. A vacuum installation comprising a column, a partition disposed transversely of the column, and constituting the bottom of a separating chamber in the column, said partition having a port, and means providing a valve seat externally of said chamber about the port, a receiver spaced beneath the port and having a drain pipe connection, a valve for said port movable to and from the seat, means supporting the valve for such movement, the valve having bias toward an open position and being sufficiently light and in sufficient proximity to said chamber to be closed upon establishment of partial vacuum in said chamber, a blower having an external outlet and an inlet connected with the chamber for establishing partial vacuum within the chamber, a vacuum inlet pipe leading into the chamber, a water supply pipe for delivering water to the separating chamber and having a control valve provided with operative connections for admitting water consequent upon the operation of said blower, the chamber being normally empty pending blower operation, and remotely controlled means for energizing and deenergizing said blower and for admitting and shutting off water, the weight of water in said chamber being adapted to open said valve upon relief of chamber vacuum whereby to dump the contents of said chamber when said blower is deenergized, with vacuum inlet pipe having an inlet fitting provided with a normally engaged closure and adapted to receive a vacuum coupling when said closure is disengaged, said closure being provided with an impulse switch operable both in the opening and the closing of said closure, the remotely controlled means of said blower including an impulse-actuated step relay having operative connection with said impulse switch.

3. In a vacuum cleaner system having a vacuum pump provided with an electric motor, the combination with said motor of controlling means therefor including a step relay having alternate circuit opening and circuit closing positions, and a remote impulse switch provided with operative electrical connections to said relay, said system including a hose coupling socket having a normally closed cover, said impulse switch comprising elements respectively connected with the socket and the cover to provide an impulse in the raising of the cover and a separate impulse in the lowering thereof.

4. In a vacuum system having fixed receiving fittings with which a tool hose coupling is selectively engageable, the combination with such a fitting including a plate provided with a socket and with a seat about the socket, a cover having means supporting it for movement to and from the seat, and switch means including elements respectively connected with the plate and with the cover and normally disengaged in the closed and in the opened position of the cover, said elements being engageable in an intermediate position of the cover respecting the seat.

5. In a vacuum system the combination with a separating chamber having a vacuum pipe leading thereto and a discharge pipe leading therefrom and a motor driven vacuum pump opening from the chamber and having a discharge connection with the last mentioned pipe, of means providing a dump port at the bottom of said chamber, said chamber having a seat about said port, a valve having means supporting it for movement to and from said seat to control discharge through said port, a water line leading to said chamber and having a controlling water valve provided with electric valve opening means connected to be energized to admit water to said chamber upon the energization of the vacuum pump motor, and means for providing an anti-siphoning connection between said water valve and said chamber, said anti-siphoning connection including a standpipe connected to receive water admitted by the water valve, a collecting trough below the standpipe having a water delivering connection to said chamber, and means for sealing such last-mentioned connection in the event no water is delivered by said standpipe.

6. The device of claim 5 in further combination with a plunger normally disposed in the standpipe and having means guiding it for moving from the standpipe in response to water delivered under pressure from the standpipe, said trough receiving the water discharged from the standpipe upon the outward movement of said plunger, and means connected with said plunger for unsealing said connection to said chamber when water is being supplied from said standpipe, whereby said water will flow from the trough into the chamber.

7. In a device of the character described, the sub-combination which comprises an inlet pipe having a delivery end, a water collecting trough spaced below the delivery end of the pipe and provided with a ported wall, a valve moveable along said wall for controlling the port, and means for opening and closing said valve in accordance with flow from said inlet pipe, said means comprising a pressure operable member associated with the pipe and connected with said valve.

8. In a device of the character described, the sub-combination which comprises a separating chamber, means for subjecting such chamber to vacuum, a vacuum cleaner pipe leading to said chamber, a water inlet fitting having a ported wall communicating with said pipe, a water collecting trough externally of said wall, a valve sheet movable along said wall between port closing and port opening positions, a standpipe extending above said trough for delivering water to the trough to flow through said ported wall into said vacuum pipe, valve control means for supplying water under pressure to said standpipe, and a pressure actuated member in the path of flow from said standpipe and connected with said valve sheet for the actuation thereof.

9. The device of claim 8 in which said member comprises a plunger receivable into the stand pipe and having a stem of reduced cross section guiding it for movement into and from the end of the pipe.

10. The device of claim 8 in which said plunger further comprises a cap enclosing the upper end of the stand pipe for guiding downwardly into the trough the water flowing from the stand pipe.

11. In a permanent vacuum cleaner installation, the combination with a separating chamber and means for exhausting air therefrom and provided with a driving motor, of a vacuum inlet pipe leading to said chamber and provided at a point remote from said chamber with an inlet fitting adapted to receive a vacuum cleaner coupling, a normally engaged closure for said fitting, and normally deenergized remote control means for starting said motor as the closure is being opened and for shutting off said motor as the closure is being closed upon said fitting, said remote control means including an impulse-actuated step relay in operative connection with the motor, and an impulse switch connected with said fitting and having normally open contacts, and means for momentarily closing said contacts both during the opening and the closing of said closure, said contacts having means for electrically connecting them with said relay.

12. In a device for separating solids from fluids, apparatus comprising: a separating chamber adapted to contain solids-entrapping liquid; means forming an exit port in said chamber for the gravity flow of liquid therethrough; a normally open movable valve movable to close said port when said chamber, when substantially empty, is subjected to vacuum, and means including a timer for first subjecting said chamber to vacuum prior to the introduction of substantial amounts of liquid to said chamber to close said valve and then for introducing liquid to said chamber in a predetermined amount controlled by said timer, said vacuum means serving to maintain said valve closed against the head of liquid in said chamber as long as said vacuum means is operating.

13. In a device for separating solids from air, apparatus comprising: a separating chamber adapted to contain solids-entrapping liquid; means forming an exit port in said chamber for the gravity flow of liquid therethrough; a normally open movable valve movable to close said port when said chamber, when substantially empty, is subjected to vacuum; means for subjecting said chamber to vacuum prior to the introduction of substantial amounts of liquid to said chamber; a conduit for air carrying entrained solids emptying into said chamber; and means for introducing liquid to said conduit for flowing mixed solids, air and liquid to said chamber to supply said liquid to said chamber, said vacuum means serving to maintain said valve closed against the head of liquid in said chamber as long as said vacuum means is operating.

14. The apparatus of claim 13 wherein said conduit carrying mixed solids, air and liquid empties into said chamber beneath the liquid level therein.

15. In a device for separating solids from air, apparatus comprising: a separating chamber adapted to contain solids-entrapping liquid; means forming an exit port in said chamber for the gravity flow of liquid therethrough; a normally open movable valve movable to close said port when said chamber, when substantially empty, is subjected to vacuum; a conduit for air carrying entrained solids emptying into said chamber, mixed air and liquid in said chamber tending to produce foam; means for simultaneously subjecting said chamber to vacuum and retaining said valve in port closing position; a float movably retained in said chamber for lifting movement by said foam; and float operated means for breaking the vacuum in said chamber and activating said chamber emptying means when said float is lifted by said foam to a predetermined position.

16. In a device for separating solids from air, apparatus comprising: a separating chamber adapted to contain solids-entrapping liquid; a conduit for air carrying entrained solids having an exit emptying into said chamber; passageway means leading to said air conduit and having an entrance; movable valve means normally closing said passageway; a liquid conduit leading to adjacent said passageway means and having an exit; and means operated by liquid flow in said liquid conduit for opening said valve means to permit flow of liquid from said liquid conduit into said passageway means and into said air conduit, and for closing said valve means in the absence of said liquid flow, said liquid operated means closing said liquid conduit in the absence of said liquid flow and said exit being spaced above said entrance and separated therefrom by a space for fall of liquid through said space to said passageway means, said spacing and said closing of said liquid conduit serving to prevent reverse liquid flow from said air conduit to said liquid conduit.

17. In a device for separating solids from air, apparatus comprising: a separating chamber adapted to contain solids-entrapping liquid; a conduit for air carrying entrained solids having an exit emptying into said chamber; vacuum means for subjecting said chamber and conduit to vacuum for causing flow of said air and entrained solids through said conduit into said chamber; means for introducing liquid into said chamber to a level above said exit whereby said conduit thereupon ejects said air and solids directly into said liquid; and means including a timer for activating said vacuum means prior to substantial introduction of liquid into said chamber.

References Cited in the file of this patent

UNITED STATES PATENTS

| | | |
|---|---|---|
| 908,409 | Hope | Dec. 29, 1908 |
| 1,618,667 | Melcher | Feb. 22, 1927 |
| 1,792,590 | Kirk | Feb. 17, 1931 |
| 2,115,499 | Salvoni | Apr. 26, 1938 |
| 2,250,974 | Stoddard | July 29, 1941 |
| 2,406,214 | Garnier | Aug. 20, 1946 |
| 2,432,757 | Weniger | Dec. 16, 1947 |
| 2,583,252 | Carraway | Jan. 22, 1952 |
| 2,671,527 | Moon | Mar. 9, 1954 |
| 2,725,113 | Fagyas | Nov. 29, 1955 |
| 2,731,103 | Ortega | Jan. 17, 1956 |
| 2,760,595 | Pynor | Aug. 28, 1956 |
| 2,763,886 | Brown et al. | Sept. 25, 1956 |
| 2,796,241 | Lhota | June 18, 1957 |
| 2,825,921 | Wright | Mar. 11, 1958 |
| 2,877,313 | Stoicos | Mar. 10, 1959 |
| 2,889,140 | Koch | June 2, 1959 |

FOREIGN PATENTS

| | | |
|---|---|---|
| 367,973 | France | Sept. 21, 1906 |
| 67,880 | Germany | Apr. 7, 1893 |